(12) United States Patent
Hetherington et al.

(10) Patent No.: US 7,353,340 B2
(45) Date of Patent: Apr. 1, 2008

(54) MULTIPLE INDEPENDENT COHERENCE PLANES FOR MAINTAINING COHERENCY

(75) Inventors: Ricky C. Hetherington, Pleasanton, CA (US); Stephen E. Phillips, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 274 days.

(21) Appl. No.: 11/205,652

(22) Filed: Aug. 17, 2005

(65) Prior Publication Data

US 2007/0043911 A1 Feb. 22, 2007

(51) Int. Cl.
*G06F 12/08* (2006.01)
*G06F 13/00* (2006.01)

(52) U.S. Cl. ............... 711/141; 711/147; 711/202; 711/203; 709/216; 709/245

(58) Field of Classification Search ............... 711/141, 711/147, 148, 154, 202, 203; 709/216, 245
See application file for complete search history.

(56) References Cited

U.S. PATENT DOCUMENTS

| | | | |
|---|---|---|---|
| 5,950,225 | A | 9/1999 | Kleiman |
| 6,088,769 | A | 7/2000 | Luick et al. |
| 6,209,064 | B1 * | 3/2001 | Weber ............... 711/141 |
| 6,212,610 | B1 | 4/2001 | Weber et al. |
| 6,631,401 | B1 | 10/2003 | Keller et al. |
| 6,701,421 | B1 | 3/2004 | Elnozahy et al. |
| 6,715,008 | B2 | 3/2004 | Shimizu |
| 6,785,773 | B2 | 8/2004 | Farago et al. |
| 7,003,631 | B2 | 2/2006 | Rowlands |
| 2001/0010068 | A1 | 7/2001 | Michael et al. |
| 2005/0138298 | A1 | 6/2005 | Downer |

OTHER PUBLICATIONS

Dean M. Tullsen, et al., "Simultaneous Multithreading: Maximizing On-Chip Parallelism," Proceedings of the 22nd Annual International Symposium on Computer Architecture, Jun. 1995, 12 pages.
Poonacha Kongetira, et al., "Niagara: A 32-Way Multithreaded Sparc Processor," IEEE 2005, pp. 21-29.
International Search Report for PCT/US2006/032174, mailed Feb. 28, 2007.
Office Action from U.S. Appl. No. 11/205,706, mailed Jul. 16, 2007.

* cited by examiner

*Primary Examiner*—Jack Lane
(74) *Attorney, Agent, or Firm*—Lawrence J. Merkel; Meyertons, Hood, Kivlin, Kowert & Goetzel, P.C.

(57) ABSTRACT

In one embodiment, a node comprises at least one processor core and a plurality of coherence units. The processor core is configured to generate an address to access a memory location. The address maps to a first coherence plane of a plurality of coherence planes. Coherence activity is performed within each coherence plane independent of other coherence planes, and a mapping of the address space to the coherence planes is independent of a physical location of the addressed memory in a distributed system memory. Each coherence unit corresponds to a respective coherence plane and is configured to manage coherency for the node and for the respective coherence plane. The coherence units operate independent of each other, and a first coherence unit corresponding to the first coherence plane is coupled to receive the address if external coherency activity is needed to complete the access to the memory location.

19 Claims, 10 Drawing Sheets

MULTIPLE INDEPENDENT COHERENCE PLANES FOR MAINTAINING COHERENCY

BACKGROUND

1. Field of the Invention

This invention is related to the field of coherent memory systems.

2. Description of the Related Art

Chip multithreading (CMT) has been proposed as one way to utilize the transistors that can now be integrated on the same semiconductor substrate, or integrated circuit chip. Particularly, one or more processor cores may be included on a chip, and each processor core is multithreaded. That is, the processor core includes hardware to have multiple threads active. Software can activate the threads for execution, and the hardware handles executing the threads, interleaving access among the instructions from different threads to shared processor core hardware, etc.

CMTs execute multiple threads/processes concurrently. Each process generally has a different virtual memory space (although some related processes may share a virtual memory space or may share certain underlying physical pages). Thus, the multiple threads concurrently active in a CMT and may generate numerous memory accesses to many different addresses. The bandwidth needed to provide for the memory accesses, and to maintain coherency, would exceed the available bandwidth and the latency would reduce performance on typical interconnects used for standard single-threaded processors such as multidrop busses, point to point interfaces such as HyperTransport™, etc.

SUMMARY

In one embodiment, a node comprises at least one processor core and a plurality of coherence units. The processor core is configured to generate an address to access a memory location, wherein the address maps to a first coherence plane of a plurality of coherence planes. Coherence activity is performed within each of the coherence planes independent of other coherence planes, and a mapping of an address space including the address to the plurality of coherence planes is independent of a physical location of the memory in a distributed system memory. Each of the plurality of coherence units corresponds to a respective coherence plane of the plurality of coherence planes and is configured to manage coherency for the node and for the respective coherence plane. The plurality of coherence units operate independent of each other, and a first coherence unit of the plurality of coherence units corresponding to the first coherence plane is coupled to receive the address if external coherency activity is needed to complete the access to the memory location.

In another embodiment, a system comprises a first node and a second node. The first node comprises a first plurality of coherence units, each of which corresponds to a respective coherence plane of a plurality of coherence planes. Each of the first plurality of coherence units are configured to operate independent of the other ones of the first plurality of coherence units and coherency activity in each of the plurality of coherence planes is independent of coherency activity in other ones of the plurality of coherence planes. The second node comprises a second plurality of coherence units, each of which corresponds to a respective coherence plane of the plurality of coherence planes, wherein each of the second plurality of coherence units are configured to operate independent of the other ones of the second plurality of coherence units. Each of the first plurality of coherence units is configured to cooperate with a corresponding one of the second plurality of coherence units to manage coherency for the respective coherence plane.

In yet another embodiment, a method comprises generating an address to access a memory location in a node of a system; mapping the address to one of a plurality of coherence planes, wherein coherence activity in each of the plurality of coherence planes is independent of other ones of the plurality of coherence planes, and wherein a mapping of addresses to coherence planes is independent of whether the address is local or remote for the node; and performing coherence activity, if needed, in the one of the plurality of coherence planes.

BRIEF DESCRIPTION OF THE DRAWINGS

The following detailed description makes reference to the accompanying drawings, which are now briefly described.

Figure 1:
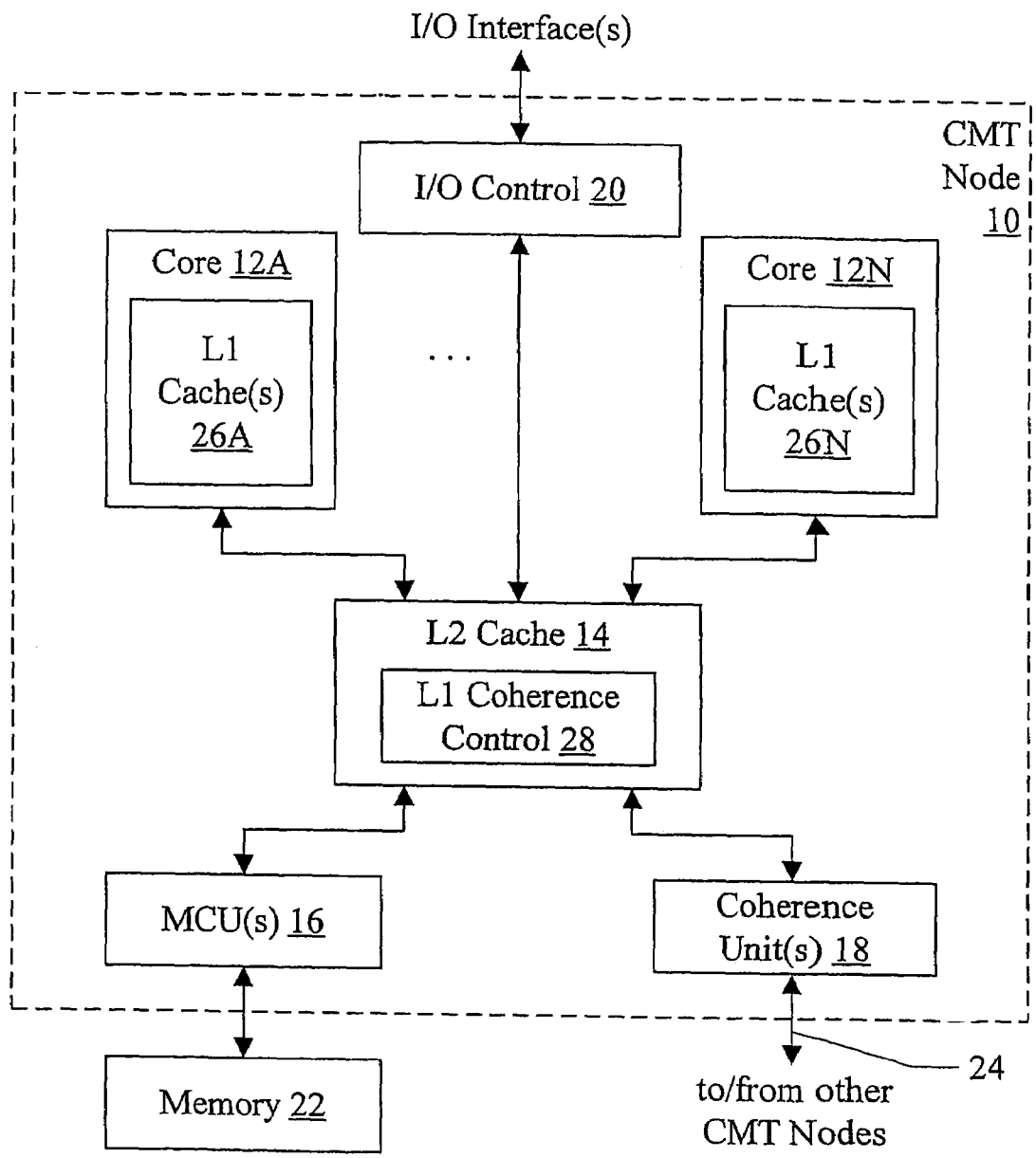
FIG. 1 is a block diagram of one embodiment of a CMT node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a CMT node 10 is shown. In one embodiment, the CMT node 10 may be a single integrated circuit "chip". In other embodiments, the node may comprise two or more integrated circuits or other circuitry. In the illustrated embodiment, the CMP node 10 comprises one or more processor cores (or more briefly, cores) 12A-12N, a second level (L2) cache 14, one or more memory control units (MCUs) 16, one or more coherence units (CUs) 18, and one or more I/O control units such as I/O control unit 20. The cores 12A-12N, the MCUs 16, the CUs 18, and the I/O control unit 20 are coupled to the L2 cache 14. The I/O control unit 20 is configured to couple to one or more I/O interfaces. The MCUs 16 are configured to coupled to one or more external memories 22. The coherence units 18 are configured to couple to one or more external interfaces 24 of the node 10 to communicate with other nodes. In the illustrated embodiment, each of the cores 12A-12N include one or more first level (L1) caches 26A-26N (and thus the cache 14 is an L2 cache). In the illustrated embodiment, the L2 cache 14 includes an L1 coherence control unit 28.

The coherence units 18 may be configured to communicate with coherence units in other nodes to maintain internode coherency for the memory accessible to the nodes. Data from the memory may be cached (e.g. in the L2 cache 14 and/or the L1 caches 26A-26N), and the coherence units 18 may ensure coherent memory access occurs (e.g. a read of a memory location results in the return of the data written by the most recent write to that memory location). Each memory location in the memory system is identified by an address, and the coherence units 18 may ensure coherent access to the memory locations based on the addresses used to access those locations. Generally, a coherence unit may comprise circuitry configured to maintain internode coherency.

In one embodiment, the coherence units 18 may be configured to provide "glueless" connection to another node 10. That is, the coherence units 18 in the two nodes may be configured to communicate directly over the external interfaces 24 with each other to provide coherence for a two node system. For more than two nodes, the coherence units 18 in each node may communicate over the external interfaces with an external coherence hub. The coherence hub may be responsible for ordering requests from the nodes, for forwarding coherence messages to other nodes, and for gathering coherence messages from the nodes (responding to coherence messages sent from the coherence hub) to ensure the coherency of each transaction.

In one embodiment, the external interfaces 24 may leverage an industry standard for at least part of the external interface definition. For example, the physical layer of communication may be leveraged. The physical layer may include the transmission media over which the communication is transmitted, as well as the circuitry used to drive the transmission media. Additionally, in some embodiments, the framing used on the standard interface may be leveraged. The logical definition of the messages transmitted in the frames may differ from the standard. More particularly, some embodiments may implement the physical layer and framing used to communicate with fully buffered dual-in line memory modules (FBDIMMs). The FBDIMM interface uses point to point links comprising multiple lanes of transmission. Each lane is a serial transmission medium, and a serializer/deserializer (SERDES) is defined for transmitting symbols over the lane. By using the FBDIMM physical interface, the same SERDES design and physical links may be used. Furthermore, the framing (defining one physical transfer on the link) and related circuitry may also be used. The FBDIMM interface may be compatible, e.g., with JEDEC specifications. (Note that JEDEC was formerly an acronym for Joint Electron Device Engineering Council, but the name is now simply JEDEC). Other standard memory interfaces may be used in other embodiments. The external interfaces used for coherency may be derived from the memory interface, sharing at least some characteristics of the memory interface.

Using the FBDIMM external interface (or another standard memory interface) for the coherent interfaces between the coherence units 18 of multiple nodes may also permit the coherent interfaces to improve performance over time in lockstep with improvements in the memory interfaces. More particularly, in one embodiment, the external interfaces 24 may be same interface as the MCUs 16 implement to interface to the memory 22. The coherent interfaces may thus "keep up" with the memory that may be included in the system with the node 10.

The node 10 and one or more other nodes in a system may each be coupled to memories such as the memory 22 shown in FIG. 1 to form a distributed memory system. The memory address space of the system may be mapped over the distributed memory system. Accordingly, a given address in a given node may be local (addressing a memory location in the memory attached to the given node) or remote (addressing a memory location in a memory attached to another node). In either case, coherence activity may be needed to perform the access coherently. Generally, coherence activity may refer to any communication or communications between nodes to ensure that a given memory access is coherent.

In one implementation, the node 10 may implement multiple independent coherence planes. That is, coherence activity in one coherence plane may be independent of coherence activity in other coherence planes. The address space is divided among the coherence planes, each address mapping to one coherence plane. The addresses within the same coherence granule map to the same coherence plane. The coherence granule may be the unit of memory for which coherency is maintained. That is, any access or modification of a byte within the coherence granule affects the coherence state of the entire granule. In one embodiment, the coherence granule is a cache line, which is the unit of allocation and deallocation of storage space in the caches. The cache line will be used as an example in this description, but any coherence granule (e.g. a fraction or multiple of a cache line size) may be used in other embodiments.

The mapping of addresses to coherence planes may be independent of the physical location, within the system, of the memory location mapped to the address. Both local and remote memory locations may be included in a given coherence plane, as may remote memory locations that are mapped to different nodes. Dividing the address space into independent coherence planes may provide higher bandwidth for coherence messages between nodes. Furthermore, the use of coherence planes may be scalable. That is, if additional bandwidth for coherence messages is needed, additional coherence planes may be added. A different coherence unit 18 may be provided for each coherence plane (and separate external interfaces 24 may also be provided for each coherence plane).

While coherence planes are described herein with respect to CMT nodes, coherence planes may also be used with non-CMT nodes (e.g. nodes comprising one or more single-threaded processor cores). Generally, a node may comprise any circuitry that is treated as a unit for system-wide coherence purposes. There may also be intranode coherency (e.g. coherency among the L1 caches 26A-26N) in some embodiments. Other embodiments (e.g. embodiments that employ a single processor core or processor cores without L1 caches) may not require intranode coherency. Similarly, the use of standard memory interfaces, such as the FBDIMM interfaces, for coherence interfaces between nodes may be employed in embodiments having non-CMT nodes.

The intranode coherency is managed, in the illustrated embodiment, by the L1 coherence control unit 28 in the L2 cache 14. The coherence control unit 28 may maintain coherence among the L1 caches 26A-26N in any desired fashion. For example, in one embodiment, the L1 coherence control unit 28 may track which cache lines are stored in each L1 cache. The L2 cache 14 may be inclusive of the L1 caches 26A-26N, in one embodiment, and the tracking may be implemented as state in the tags of each L2 cache block. Alternatively, the L2 cache 14 may include separate tags for the L1 cache tracking. The L2 cache 14 may perform a reverse lookup on these separate tags based on the L2 index and way to read the information identifying which L1 caches 26A-26N have a copy of the cache block.

The L1 coherence control unit 28 may also respond to requests from the coherence units 18. The coherence units 18 may provide snoop requests, invalidate requests, etc. as part of maintaining internode coherence, and the coherence control unit 28 may respond accordingly and may cause state changes in the L1 caches 26A-26N as needed. The L1 coherence control unit 28 may generate communications to the L1 caches 26A-26N to maintain intranode coherency and to respond to requests from the coherence units 18 to maintain internode coherency. The communications may include, for example, invalidate requests, requests to writeback modified cache lines, state change requests, etc. The L1 coherence control unit 28 may have any interconnect with the L1 caches 26A-26N.

The processor cores 12A-12N may be configured to execute instructions and to process data according to a particular instruction set architecture (ISA). In one embodiment, cores 12A-12N may be configured to implement the SPARC® V9 ISA, although in other embodiments it is contemplated that any desired ISA may be employed, such as x86, PowerPC® or MIPS®, for example. In the illustrated embodiment, each of cores 12A-12N may be configured to operate independently of the others, such that all cores 12A-12N may execute in parallel. In some embodiments, each of cores 12A-12N may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core may also be referred to as a multithreaded (MT) core. In one embodiment, there may be 8 cores 12A-12N, each of which may be configured to concurrently execute instructions from eight threads, for a total of 64 threads concurrently executing across CMT 10. However, in other embodiments it is contemplated that other numbers of cores 12A-12N (including one core) may be provided, and that cores 12A-12N may concurrently process different numbers of threads. A thread may be referred to as "active" if the thread is in execution in a core, even if none of the instructions from that thread are being executed at that point in time. Viewed in another way, a thread may be active if at least a portion of the context of the thread is being maintained in a core and the core may fetch and execute instructions from the thread without software intervention. In contract, inactive threads may be in memory or elsewhere (e.g. paged to disk) awaiting scheduling to a core.

More specifically, in one embodiment each of cores 12A-12N may be configured to perform fine-grained multithreading, in which each core may select instructions to execute from among a pool of instructions corresponding to multiple threads, such that instructions from different threads may be scheduled to execute adjacently. For example, in a pipelined embodiment of a core 12A-12N employing fine-grained multithreading, instructions from different threads may occupy adjacent pipeline stages, such that instructions from several threads may be in various stages of execution during a given core processing cycle.

In the illustrated embodiment, the cores 12A-12N include L1 caches 26A-26N. Any cache configuration and capacity may be implemented. For example, in one embodiment, separate L1 instruction and data caches may be implemented to store instructions for core execution and data operated upon by the core, respectively. Other embodiments may have a shared instruction/data cache.

The L2 cache 14 may be configured to cache instructions and data for use by cores 12A-12N. In one embodiment, the L2 cache 14 may be organized into eight separately addressable banks that may each be independently accessed, such that in the absence of conflicts, each bank may concurrently return data to a respective core 12A-12N. In some embodiments, each individual bank may be implemented using set-associative or direct-mapped techniques. For example, in one embodiment, the L2 cache 14 may be a 4 megabyte (MB) cache, where each 512 kilobyte (KB) bank is 16-way set associative with a 64-byte cache line size, although other cache sizes and geometries are possible and contemplated. The L2 cache 14 may be implemented in some embodiments as a writeback cache in which written (dirty) data may not be written to system memory until a corresponding cache line is evicted. Other embodiments may implement other numbers of banks.

The MCUs 16 may be configured to manage the transfer of data between the L2 cache 14 and the memory 22. In some embodiments, multiple instances of an MCU may be implemented, with each instance configured to control a respective bank of system memory. The MCUs 16 may be configured to interface to any suitable type of system memory, such as FBDIMMs, Double Data Rate or Double Data Rate 2 Synchronous Dynamic Random Access Memory (DDR/DDR2 SDRAM), or Rambus® DRAM (RDRAM®), for example. In some embodiments, the MCUs 16 may be configured to support interfacing to multiple different types of system memory.

The I/O control unit 20 may be configured to provide a central interface for various input/output and/or peripheral devices to exchange data with the cores 12A-12N through memory locations (e.g. cached in the L2 cache 14 or in the memory 22). In some embodiments, the I/O control unit 20 may be configured to coordinate Direct Memory Access (DMA) transfers of data between various devices coupled to one or more I/O interfaces such as network interfaces and/or peripheral interfaces and system memory. In addition, in one embodiment, the I/O control unit 20 may be configured to couple CMT node 10 to external boot and/or service devices. The I/O interfaces coupled to the I/O control unit 20 may include one or more peripheral interfaces configured provide connection for one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, the peripheral interface may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol, IEEE 1394 (Firewire®) protocol, PCI, etc. in addition to or instead of PCI Express™. The I/O interfaces may also include one or more network interfaces to couple the CMT node 10 to a network. In one embodiment, the network interface may be an Ethernet (IEEE 802.3) networking standard such as Gigabit Ethernet or 10-Gigabit Ethernet, for example, although it is contemplated that any suitable networking standard may be implemented. In some embodiments, the network interface may be configured to implement multiple discrete network interface ports.

Figure 2:
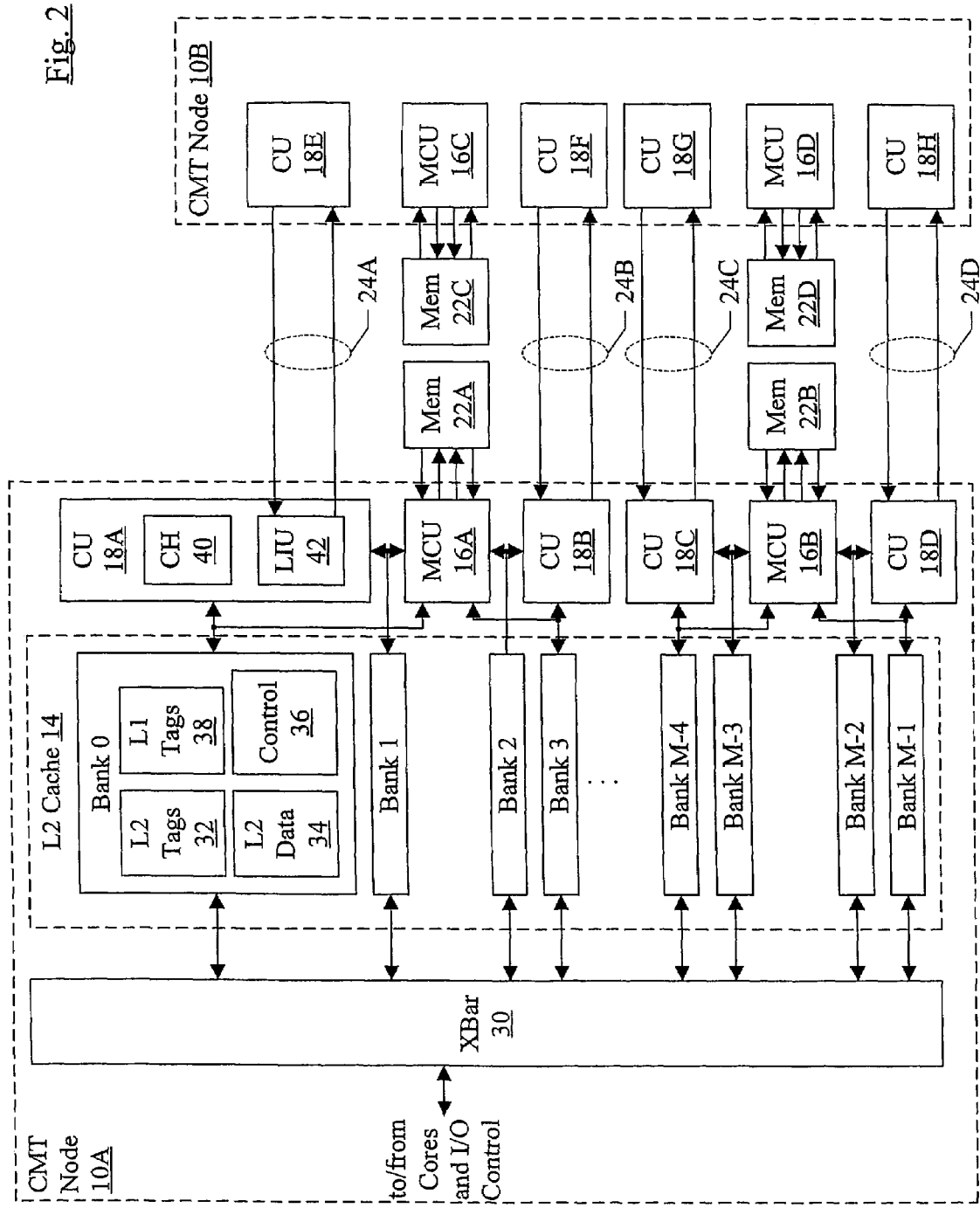
FIG. 2 is a block diagram of one embodiment of two CMT nodes coupled together.

Turning now to FIG. 2, a block diagram is shown of one embodiment of a system employing two CMT nodes 10A and 10B, each of which may be an instantiation of the node 10 shown in FIG. 1. The CMT node 10A includes a crossbar (XBar) 30, the L2 cache 14, coherence units 18A-18D (each of which may be an instantiation of a coherence unit 18 as shown in FIG. 1), and memory control units 16A-16B (each of which may be an instantiation of a memory control unit 16 as shown in FIG. 1). The node 10B similarly includes coherence units 18E-18H and memory control units 16C-16D (and may also include the L2 cache 14, etc., similar to FIG. 1 and not shown in FIG. 2). The crossbar 30 is coupled to communicate to/from the cores 12A-12N and the I/O control unit 20, and is coupled to the L2 cache 14. The coherence units 18A-18D and the memory control units 16A-16B are coupled to the L2 cache 14 as well. The coherence units 18A-18D are each coupled to a respective external interface 24A-24D (each of which is an instantiation of the interface 24 shown in FIG. 1) to which coherence units 18E-18H are respectively coupled as shown in FIG. 2. The coherence unit 18A is shown in more detail to include a coherence hub (CH) 40 and a link interface unit (LIU) 42, and the coherence units 18B-18H may be similar. The memory control units 16A-16D are coupled to respective memories 22A-22D (each of which may be an instantiation of the memory 22 shown in FIG. 1). Collectively, the memories 22A-22D form a distributed memory system over which the memory address space of the system is distributed.

More particularly, the L2 cache 14 in the illustrated embodiment comprises M banks shown as bank 0 to bank M-1 in FIG. 2 (M is an integer). The number of banks may be varied from embodiment to embodiment. In one implementation, the number of banks may be greater than or equal to the number of cores 12A-12N, providing high bandwidth cache access to the cores 12A-12N. In one particular implementation, 8 banks may be used, although any number of banks may be implemented in various embodiments. Bank 0 is shown in greater detail to include an L2 tags memory 32, an L2 data memory 34, a control unit 36, and an L1 tags memory 38. Other banks 1 to M-1 may be similar to bank 0.

Each cache line is mapped, according to its address, to one of the banks 0 to M-1. Accordingly, the crossbar 30 may include logic (such as multiplexers or a switch fabric, for example) that allows any core 12A-12N to access any bank 0 to M-1 of the L2 cache 14, and that conversely allows data to be returned from any L2 bank 0 to M-1 to any core 12A-12N. The crossbar 30 may be configured to concurrently process data requests from the cores 12A-12N to the L2 cache 14 as well as data responses from the L2 cache 14 to the cores 12A-12N. In some embodiments, the crossbar 30 may also include logic to queue data requests and/or responses, such that requests and responses may not block other activity while waiting for service. Additionally, in one embodiment, the crossbar 30 may be configured to arbitrate conflicts that may occur when multiple cores 12A-12N attempt to access a single bank of the L2 cache 14 or multiple banks attempt to return data responses to a single core 12A-12N.

The L2 tags memory 32 may store the tags of cache lines currently stored in bank 0, along with various status information. The status information may include whether or not the cache line is valid, along with its coherency state according to the internode coherency scheme implemented in the system. For example, the Modified, Exclusive, Shared, Invalid (MESI) scheme may be used or the MOESI scheme (including the MESI states and the Owned state) may be used. Variations of the MESI and/or MOESI schemes may be used, or any other scheme may be used. In response to a request from a core 12A-12N or the I/O control unit 20, if the address is a hit in the L2 tags memory 32 but the coherency state does not permit the completion of the request, the control unit 36 may generate a coherence message to the coherence unit 18A to obtain the appropriate coherence state. The coherence message may include the address, as well as the type of request. Similarly, if the address is a miss in the L2 tags memory 32, the control unit 36 may generate a coherence message to the coherence unit 18A to obtain a copy of the cache line in the appropriate coherence state. If the coherency state does permit the completion of the request, the control unit 36 may complete the request (updating the L2 data memory 34 and/or supplying data from the L2 data memory 34).

Additionally, the control unit 36 may track which cache lines are stored in which L1 caches using the L1 tags memory 38. In one embodiment, the L1 tags memory 38 includes a location for each tag in the L2 tags memory 32. The L1 tags memory 38 may be indexed by the L2 tag, and may store data that identifies which L1 caches, if any, are storing a copy of the cache line. The control unit 36 may consult the L1 tags memory 38 when permitting a request to complete, to manage the coherency of the L1 caches. That is, if a state change in one L1 cache in one core is needed to permit the request from another core to complete, the control unit 36 may generate the communication to that core/L1 cache to cause the state change. Additionally, the control unit 36 may update the L1 tags memory 38 to reflect completion of the request (e.g. indicating that the L1 cache has a copy of the cache line, that the cache line is modified in that L1 cache if the request is a write, etc.). Accordingly, the control unit 36 (or at least the portion that interacts the L1 tags memory 38 and controls coherency) may form a portion of the L1 coherence control unit 28 shown in FIG. 1, along with similar portions of the other banks 1 to M-1.

Each of the coherence units 18A-18D may correspond to a different coherence plane, as mentioned above. In the illustrated embodiment, each of the banks is coupled to one of the coherence units 18A-18D, and not to the other coherence units 18A-18D. Thus, addresses that map to a given bank also belong to the coherence plane corresponding to the coherence unit 18A-18D to which the given bank is coupled. For example, in the illustrated embodiment, pairs of banks are coupled to each coherence unit 18A-18D. Specifically, banks 0 and 1 are coupled to the coherence unit 18A; banks 2 and 3 are coupled to the coherence unit 18B; banks M-4 and M-3 are coupled to the coherence unit 18C;

and banks M-2 and M-1 are coupled to the coherence unit 18D. In other embodiments, a single bank may be coupled to each coherence unit, or more than two banks may be coupled to a given coherence unit. Still other embodiments may map addresses to coherence units/planes in other fashions. In one implementation, pairs of banks are mapped to coherence units and there are 8 banks, so there are 4 coherence units/planes. Other implementations may implement other numbers of banks and coherence planes.

Since banks are assigned to specific coherence planes in this embodiment, data and other responses returned from the external interfaces 24A-24D may be driven to the banks assigned to the corresponding coherence plane. Serialization of data transfers from the coherence units 18A-18D across all the banks, complex interconnect such as the crossbar 30, etc. may not be required. For example, in the illustrated embodiment, data returned for a request on one of the coherence planes need only be driven to the pair of banks corresponding to that coherence plane, and one of the pair may be enabled to write the data. A high speed cache to cache transfer from another node's L2 to the L2 cache 14 in the node 10A may thus be supported, in some embodiments.

A given bank may store data for both local and remote addresses, and thus local and remote addresses may be mixed in the same coherence plane. Even if an address is local, coherency activity may be needed (e.g. to invalidate remotely cached copies of the data, to obtain a remotely cached and updated copy of the data, etc.).

Each of the coherency units 18A-18D operates independently, over its corresponding interface 24A-24D, to maintain coherency for addresses within its corresponding coherence plane. That is, the coherency activity of each coherency unit 18A-18D may not impact the coherency activity of the other coherency units, either logically or physically. In the illustrated embodiment, each coherency unit 18A-18D may communicate directly with the corresponding coherency unit 18E-18H, respectively, in the node 10B. That is, the coherency units 18A and 18E, for example, cooperate directly and exchange coherence messages over the interface 24A to ensure the coherency of a given cache line. The independence of coherence planes/coherence units may provide scalability for coherence bandwidth between nodes. Bandwidth may be increased by adding coherence planes to the address space. In some multi-threaded embodiments, the scalability provided by the coherence planes may help provide the higher memory bandwidth requirements often exhibited by multi-threaded execution.

As illustrated for the coherence unit 18A in FIG. 2, each of the coherence units 18A-18H may implement a coherence hub 40 that may serve as the point of serialization and global ordering for the corresponding coherence plane. That is, the order that requests arrive at the coherence hub 40 is the order for coherency purposes. The coherence hub 40 may receive requests corresponding to the coherence plane, serialize and order the requests, generate coherence messages to nodes other than a source node for a request and collect responses from those other source nodes, and communicate completion of the coherence activity to the source node. An exemplary coherence protocol and the messages used are described in more detail below with regard to FIGS. 8, 9, and 10.

As mentioned previously, the interfaces 24 may leverage a standard interface for physical layer and framing. For example, the FBDIMM interface may be used, and may be implemented by the memory control units 16A-16D as well to communicate with the memories 22A-22D. In one implementation, the FBDIMM memory interfaces implemented by the memory control units 16A-16D may include synchronous unidirectional point to point links. The northbound (from memory to the memory control unit) link may be 14 lanes wide and the southbound (from the memory control unit to the memory) link may be 12 lanes wide. A frame may be 12 transfers on the lanes. The widths and frame size may be changed from time to time as the FBDIMM interface standard evolves. In one embodiment, the external interfaces 24 may comprise FBDIMM interconnect that is 14 lanes wide in both directions, with a frame size of 12 transfers, for 168 bits per frame. That is, the external interfaces 24 may comprise FBDIMM links similar to the northbound links of the interfaces to the memories 22.

The link interface unit 42 may implement the physical layer and framing of the transmissions on the interface 24A. Thus, the link interface unit 42 may use a standard design for the FBDIMM interconnect, in one embodiment. The existing design may be leveraged to save design time and cost.

In the illustrated embodiment, the memory control units 16A-16B may also be coupled to specific banks 0 to M-1 and not coupled to other banks. The memory control units 16C-16D may be coupled similarly to L2 banks in the node 10B (not shown in FIG. 2). For example, the memory control unit 16A in FIG. 2 is coupled to banks 0 through 3, and the memory control unit 16B is coupled to banks M-4 through M-1. Each memory control unit is thus coupled to a quad (two pairs) of banks, corresponding to two coherence planes. In the present embodiment, two FBDIMM interfaces provided between each memory control unit 16A-16D and the corresponding memory 22A-22D. Providing two FBDIMM interfaces may permit 128 bits of data plus 16 bits of ECC and chip kill support in the memory control units 16A-16D. Other embodiments may have one FBDIMM interface or more than two. Furthermore, the number of banks coupled to a given memory control unit may be varied in other embodiments, as may the number of memory control units per node.

While the control unit 36 (and more generally the L2 cache 14) generates coherence messages to maintain internode coherency for a request in the present embodiment, other embodiments may not include an L2 cache and may generate the coherence messages from any source. Generally, circuitry within the node 10A-10B may be configured to generate coherence messages to initiate intranode coherency activity for a given request.

Figure 3:
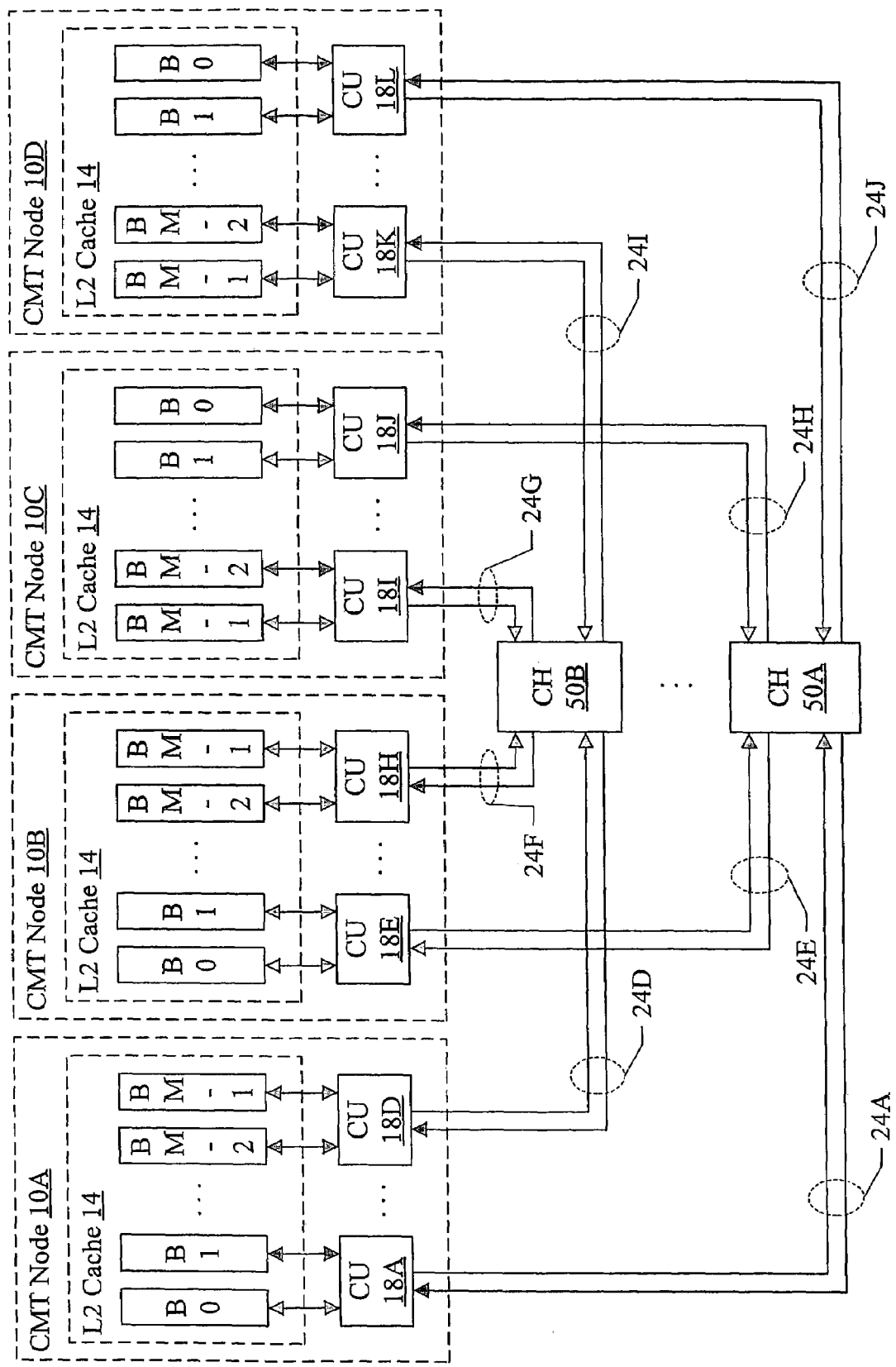
FIG. 3 is a block diagram of one embodiment of four CMT nodes coupled together via external coherence hubs.

FIG. 3 is a block diagram of another embodiment of a system comprising 4 CMT nodes 10A-10D, each of which may be an instantiation of the node 10 shown in FIG. 1. Illustrated in FIG. 3 is the L2 cache 14 in each node 10A-10D, with banks 0 to M-1. Each pair of banks is coupled to a corresponding coherence unit. For example, banks 0 and 1 are coupled to coherence unit 18A and banks M-2 and M-1 are coupled to the coherence unit 18D in node 10A. Nodes 10B-10D similarly include coherence units 18E and 18H-18L coupled to banks 0 and 1 or M-2 and M-1 as shown in FIG. 3. Each coherence unit is coupled to an interface (e.g. interfaces 24A and 24D-24J as shown in FIG. 3. Also illustrated are external coherence hubs 50A and 50B. There may be one coherence hub for each coherence plane. The interfaces coupled to coherence units for a given coherence plane in each node are coupled to the corresponding coherence hub. For example, the interfaces 24A, 24E, 24H, and 24J are coupled to the coherence units 18A, 18E, 18J, and 18L, all of which are coupled to banks 0 and 1 of the L2 cache 14 in their respective nodes. The interfaces 24A, 24E, 24H, and 24J are also coupled to the coherence hub 50A. The coherence hub 50A is the point or serialization and global (internode) ordering for the coherence plane corresponding to banks 0 and 1. Similarly, the coherence hub 50B is the coherence hub for the coherence plane corresponding to banks M-2 and M-1. Other coherence hubs, not shown in FIG. 3, correspond to other coherence planes.

When the external coherence hubs are in use, such as the system of FIG. 3, the internal coherence hubs 40 may be disabled. The link interface units 42 may still be used to transmit the coherence messages to the external coherence hubs. While four nodes 10A-10D are shown in FIG. 3, other embodiments may have any number of three or more nodes with external coherence hubs. In still other embodiments, internal coherence hubs may not be implemented and external coherence hubs may be used with any number of two or more nodes.

Figure 4:
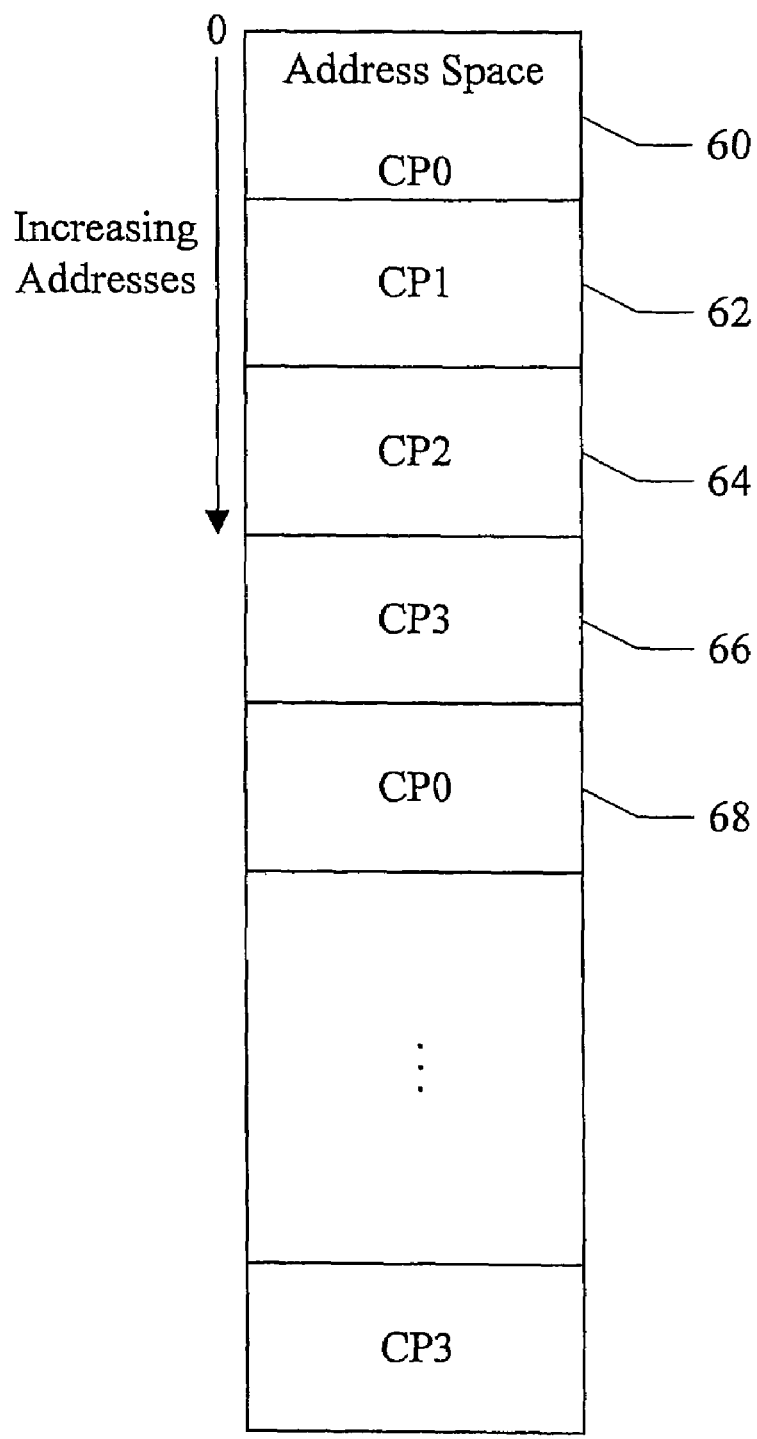
FIG. 4 is a block diagram illustrating one embodiment of mapping an address space to multiple coherence planes.

The mapping of addresses to L2 cache banks, and thus the mapping of addresses to coherence planes, may be fixed or programmable, in various embodiments. Generally, the coherence planes may be interleaved throughout the address space as illustrated in FIG. 4. FIG. 4 is a block diagram illustrating an address space divided into coherence planes for one embodiment. Address 0 is depicted at the top, and addresses increase toward the bottom of the address space as shown in the figure. The first few addresses are mapped to coherence plane 0 (CP0) (reference numeral 60), followed by addresses mapped to coherence planes 1, 2, and 3 in turn (reference numerals 62, 64, and 66), and then returning to coherence plane 0 (reference numeral 68). The size of the interleave may vary from embodiment to embodiment. In one embodiment, for example, pairs of L2 cache banks are mapped to the same coherence plane and thus the interleave may occur on boundaries that are twice the cache line size (e.g. 128 byte boundaries, for a 64 byte cache line size).

As mentioned above, the mapping of addresses to coherence planes may be independent of the physical memory location to which the addresses are mapped in the distributed memory system. That is, a given coherence plane may include a mix of local and remote addresses, and remote addresses mapped to memory attached to different remote nodes. The mapping of the address space to the distributed memories may be fixed or programmably selectable. For example, in one embodiment, the mapping may be programmably selected to occur on 512 byte or 1 Gigabyte boundaries. Other embodiments may include more mapping options and/or different mapping options.

Figure 5:
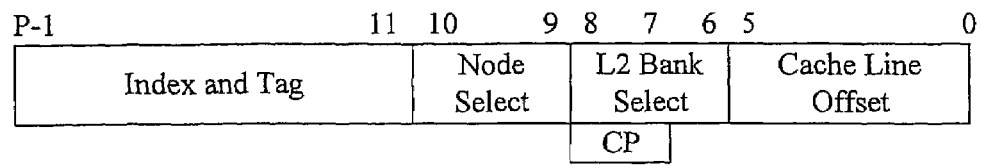
FIG. 5 is a block diagram of one embodiment of an address and fields within the address.

Turning next to FIG. 5, a block diagram is shown illustrating one embodiment of fields within an address for a 512 byte boundary for mapping of addresses to nodes in the distributed memory system. The address may be P bits (P-1 to 0), where P is an integer. For example, 40 bits may be used although more or fewer bits may be used in other embodiments. In the embodiment of FIG. 5, the least significant 6 bits (bits 5:0) are the cache line offset since the cache line size is 64 bytes in this embodiment. Bits 8:6 are the L2 bank select bits (for an 8 bank L2 cache). Since pairs of banks are mapped to coherency planes, bits 8:7 also identify the coherence plane (CP) to which the address is mapped for this embodiment. Bits 10:9 select the node, for a four node system, and the remaining bits are L2 index and tag bits. Bit 9 may be used to select the node for a two node system, and additional bits (e.g. bit 11, bit 12, etc.) may be used for systems having more than four nodes.

Figure 6:
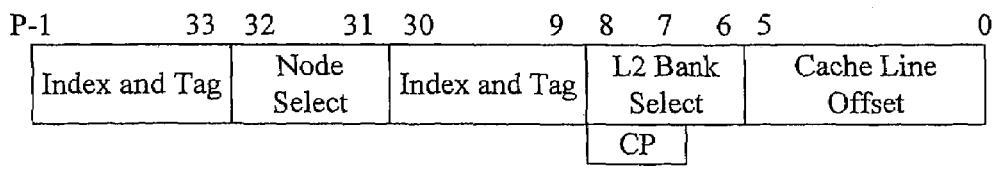
FIG. 6 is a block diagram illustrating one embodiment of address bits from the address shown in FIG. 5 and mapping the L2 cache banks and coherence planes.

FIG. 6 is a block diagram illustrating the mapping of addresses to L2 cache banks and coherence planes in a tabular form, for one embodiment using the address fields illustrated in FIG. 5. The values for address bits 8:6 are illustrated on the horizontal axis of the table, and the values for address bits P-1:9 are illustrated on the vertical axis of the table. For P-1:9 equal to zero (first row of the table), the addresses are all mapped to node 0 (N0). Eight cache lines are shown (B0 to B7), one for each value of bits 8:6. Pairs of cache lines map to respective coherence planes CP0 to CP3. For P-1:9 equal to one (second row of the table), the addresses are all mapped to node 1 (N1), etc. through node 3 for P-1:9 equal to 3. For P-1:9 equal to four, the mapping is back to node 0 again, as shown in the last illustrated row of the table. Similar rows may exist for each additional value of P-1:9.

Figure 7:
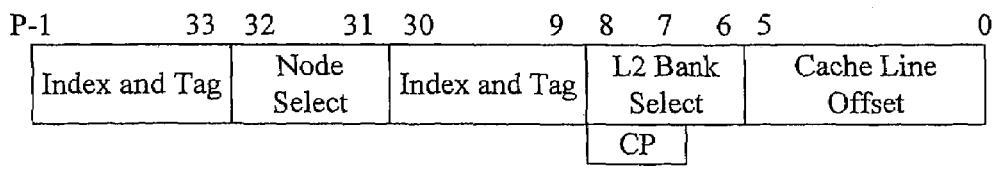
FIG. 7 is a block diagram of another embodiment of an address and fields within the address.

FIG. 7 is a block diagram illustrating one embodiment of fields within an address for a 1 Gigabyte boundary for mapping of addresses to nodes in the distributed memory system. In the embodiment of FIG. 7, similar to the embodiment of FIG. 6, bits 5:0 are the cache line offset, bits 8:6 are the L2 bank select bits, and bits 8:7 identify the coherence plane. Bits 32:31 select the node, for a four node system, and the remaining bits are L2 index and tag bits.

The coherence messages and coherence protocol are described next. For this description, the source node may be the node that initiates coherence activity (e.g. due to a cache miss for an address, or to upgrade ownership of the cache line to complete a request, etc.). The coherence hub is also shown, which is the coherence hub for the coherence plane to which the address affected by the coherence activity is mapped. In embodiments similar to FIG. 2, the coherence hub may be integrated into one of the nodes. In embodiments similar to FIG. 3, the coherence hub may be external to the nodes. Other nodes are also shown. To facilitate illustrating the difference between a node that is the memory agent of a remote address from the source node and a non-memory agent, two other nodes are shown. A memory agent is the node to which the address is mapped within the distributed memory system. That is, the physical memory location in the main memory that is mapped to the address is in the memory attached to the memory agent node.

In one embodiment, the coherence messages may be categorized into three categories: requests, responses, and data. The request category may include the request generated by the source node to the coherence hub and also forwarded requests from the coherence hub to other nodes. The forwarded requests may be generated by the coherence hub in response to source node requests. The response category may include a forwarded request acknowledgement from the coherence hub to the source node indicating that the request has been serialized/ordered in the hub; a node snoop reply from each node to the coherence hub indicating the node's response to the snoop; a forwarded snoop reply from the coherence hub to the source node indicating the aggregate snoop response from all nodes; and a source identifier release message from the coherence hub to the source node, indicating that the source ID assigned to a request may be reused. The data category may include a node data message from the source node to the coherence hub including the data from the source node (e.g. for write requests); a forwarded data message from the coherence hub to a target node; a node data reply including data from a snoop hit or data from a memory agent, from a node to the coherence hub; and a forwarded data reply from the coherence hub to the source node including data from a node that detected a snoop hit or data provided by a memory agent.

Figure 8:
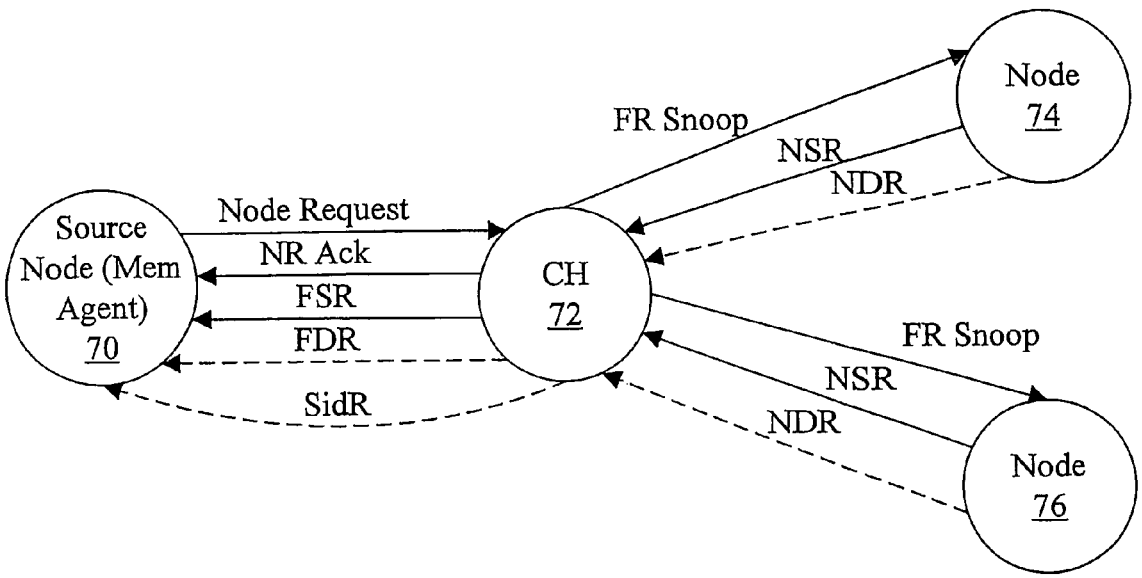
FIG. 8 is a block diagram illustrating one example of one embodiment of a coherency maintenance protocol for data that is local to the source node.

FIG. 8 is a block diagram illustrating communications according to one embodiment of the coherence protocol and coherence messages. In the example of FIG. 8, the source node is also the memory agent for the address affected by the coherency activity. That is, the address is local to the source node. A source node 70 is illustrated, along with a coherence hub 72 and two other nodes 74 and 76. The example of FIG. 8 may represent coherence activities for various read requests (e.g. read to share, read to own, read to discard, etc.) as well as a flush request that causes a flush of the affected cache line (except that no data is returned to the source node for the flush, but rather is returned to the memory agent node). While 3 nodes are shown in FIG. 8, any number of two or more nodes may be used in various embodiments.

The source node 70 transmits a node request to initiate the coherence activity. The node request may include a source identifier (SID) that may be used to identify the various coherence messages associated with the coherence activity for this request from among all coherence messages being exchanged on the coherence plane. The request may also include the address, a request type, etc. The coherence hub 72 receives the node request, serializes and orders the requests with other requests, and transmits a forwarded request snoop (FR snoop) to the nodes 74 and 76. Additionally, the coherence hub 72 transmits a node request acknowledge (NR Ack) to the source node 70. The source node 70 may use the NR Ack to trigger a speculative read to the local memory, for example.

Each of the nodes 74 and 76 snoop the address from the FR snoop message and transmit node snoop reply (NSR) messages to the coherence hub 72. The NSR messages may indicate the state of the cache line in the nodes 74 and 76, respectively. If a hit in the owned state or modified state is indicated, the node 74 or 76 may subsequent respond with a node data reply message (NDR, illustrated by dashed line in FIG. 8 to indicate that the message may or may not be transmitted dependent on the snooped coherence state in the node 74 or 76). The coherence hub 72 receives the NSR messages, and aggregates the response from all nodes to transmit a forwarded snoop response (FSR) to the source node 70. If data is also provided, a forwarded data response (FDR) containing the data is provided by the coherence hub 72 to the source node 70. The FDR may also indicate if the data is from the responding node's cache, and thus the data may be a cache to cache transfer to the source node's L2 cache.

Either the FSR or the FDR messages may include an indication that the SID for the request is being released, and thus may be reused for another request by the source node 70. Since the SID release is included in another message, the these mechanisms provide an implicit release of the SID. Bandwidth may be conserved if the SID can be released via an indication in another message, and in some cases an early release of the SID message may permit the SID to be reused earlier than would be otherwise possible. For example, if the FSR message indicates no hits for an address that is local to the source node 70, the FSR is the last message transmitted by the coherence hub and the SID release may be included in the FSR. If the FDR message is the last message transmitted, the SID release may be included in the FDR message. However, in some cases, it may not be possible to release the SID in an FSR or FDR message. In such cases, the coherence hub may generate an explicit SID release message (SidR). Thus, a flexible SID release mechanism may be supported in some embodiments.

Figure 9:
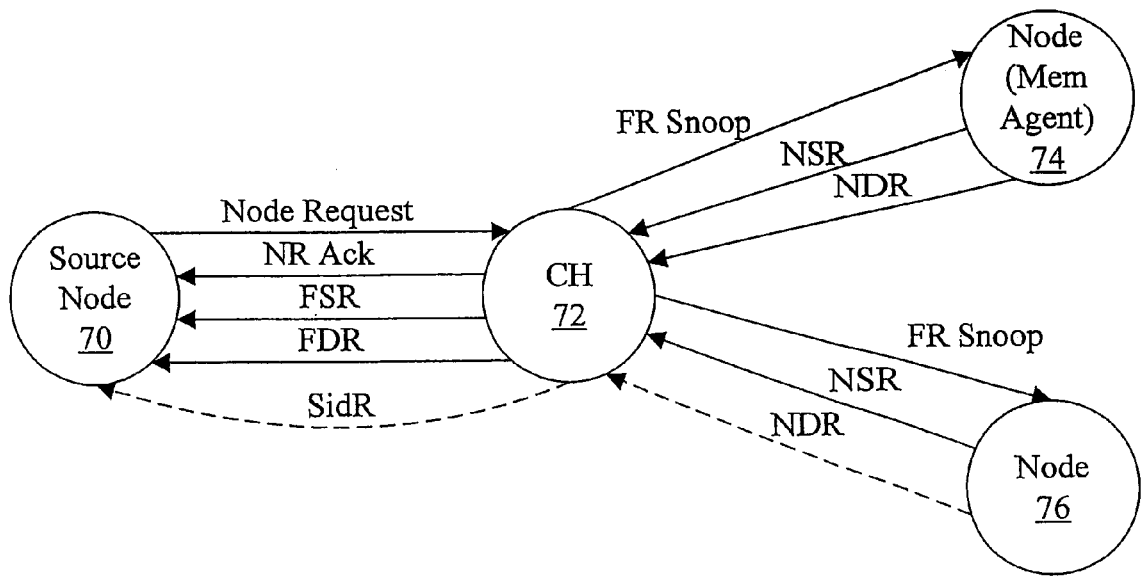
FIG. 9 is a block diagram illustrating one example of one embodiment of a coherency maintenance protocol for data that is remote to the source node.

FIG. 9 is a block diagram illustrating communications according to one embodiment of the coherence protocol and coherence messages. In the example of FIG. 9, the source node is not the memory agent for the address affected by the coherency activity. That is, the address is remote to the source node. Particularly, the node 74 is the memory agent for the address in this example. The example of FIG. 9 may represent coherence activities for various read requests (e.g. read to share, read to own, read to discard, etc.) and a flush message. While 3 nodes are shown in FIG. 9, any number of two or more nodes may be used in various embodiments.

Similar to FIG. 8, the source node 70 issues a node request to the coherence hub 72, which transmits FR snoops to nodes 74 and 76 and an NR Ack to the source node 70. Node 74 responds with an NSR message that indicates that node 74 is the memory agent for the address, and also provides an NDR with the data from the node 74 (either from the L2 cache or from the memory attached to the node 74). The node 76 provides an NSR message, and may provide an NDR with data if the NSR has the data in owned or modified state. The coherence hub 72 transmits the FSR message to the source node 70, aggregating the NSRs from the nodes 74 and 76. If the node 76 responds with data, that data may supersede the data from the node 74 (as it may be more recent than the data from the node 74) and may be provided in the FDR to the source node 70. Otherwise, the data provided by the node 74 is provided in the FDR to the source node 70. Optionally, the SidR message may be transmitted if the SID is not released in the FSR or FDR message.

In some embodiments, a node request may be made to upgrade ownership of a cache line in a source node so that an access may be completed within the source node. For example, an invalidate request may be used to upgrade a shared or owned state to modified to complete a write request. Such requests may operate similar to FIGS. 8 and 9, except that no data may be transmitted.

Figure 10:
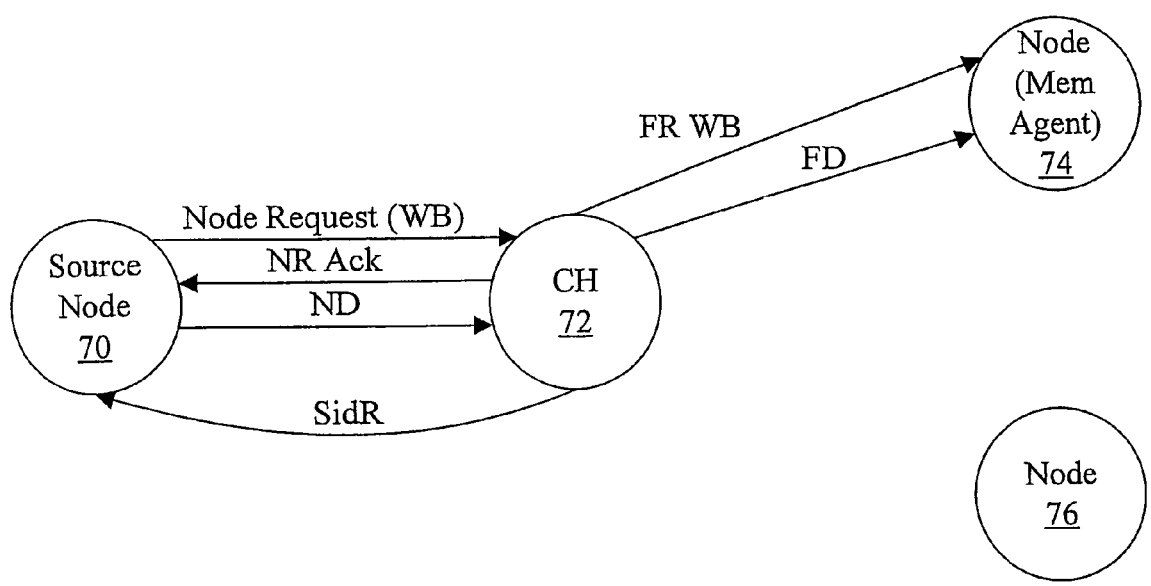
FIG. 10 is a block diagram illustrating one example of one embodiment of a coherency maintenance protocol for a writeback from a source node.

FIG. 10 is a block diagram illustrating communications according to one embodiment of the coherence protocol and coherence messages. In the example of FIG. 10, the source node performs a writeback to the memory agent for the address. Particularly, the node 74 is the memory agent for the address in this example. The node 76 is also shown, although it is not involved in the writeback operation.

The source node 70 transmits a node request for the writeback (WB) to the coherence hub 72. The coherence hub 72 transmits the NR Ack to the source node 70, and the forwarded request WB (FR WB) to the node 74, which is the memory agent for the address. The source node 70 transmits the node data (ND) to the coherency hub 72, which forwards the data as a forwarded data (FD) message to the node 74. Additionally, the coherence hub 72 may transmit the SidR message to the source node 70 to free the SID assigned to the writeback.

Non-cacheable requests and I/O requests (e.g. from the I/O control unit 20) may be performed without coherence activity, and thus may be similar to the communication shown in FIG. 10. For non-cacheable or I/O reads, the direction of data flow is the opposite of that shown in FIG. 10.

Figure 11:
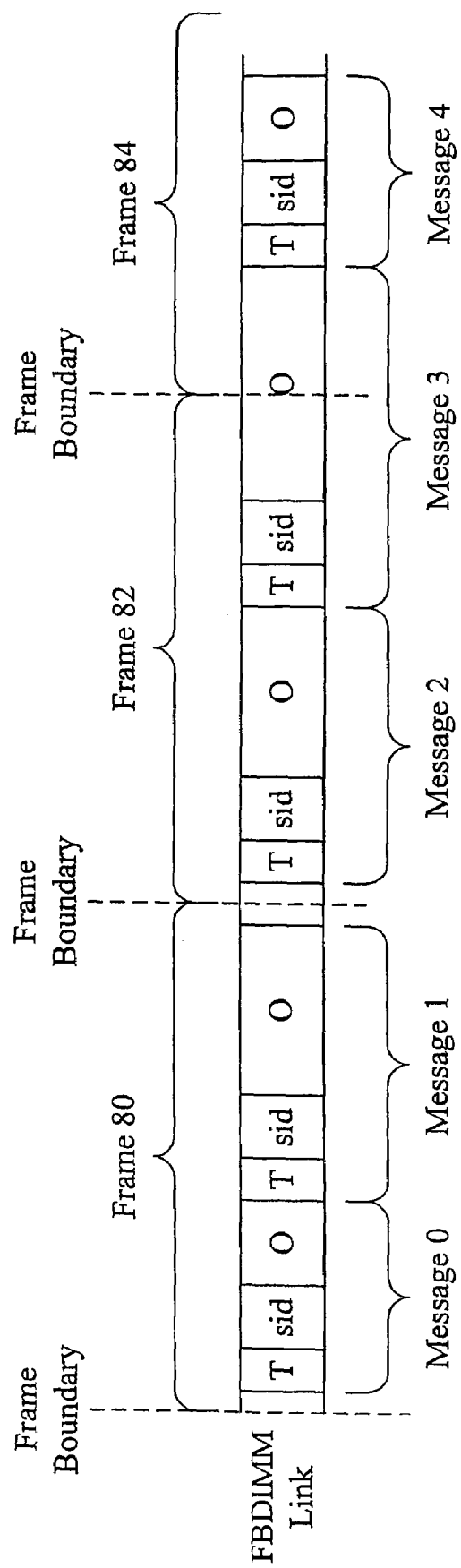
FIG. 11 is a block diagram illustrating one embodiment of framing on an interconnect between nodes and coherency messages.

Turning now to FIG. 11, a block diagram of one embodiment of an FBDIMM link is shown, illustrating the transmission of coherence messages on the FBDIMM link. Frame boundaries on the link are illustrated in FIG. 11 as vertical dashed lines. Accordingly, two frames 80 and 82 are shown, and a portion of a frame 84 is shown.

FIG. 11 illustrates that, although the physical layer and framing of the FBDIMM interface are used for the coherent links between nodes, the coherence messages may not be bound to the frames. For example, two or more coherence messages may be transmitted within the same frame. In frame 80 in FIG. 11, two coherence messages (messages 0 and 1) are transmitted. Additionally, coherence messages may straddle a frame boundary. For example, message 3 in FIG. 11 is partially transmitted in frame 82 and partially in frame 84.

Coherence messages may generally have any format. In the illustrated embodiment, the coherence messages may each include a type field (T), an SID field (sid), and other information (O). The other information may be message-specific, and may include information such as one or more of the address, the data, a request field identifying which specific request or response is transmitted, a destination node identifier, various status bits, etc. Different coherence message types may have different lengths. The bandwidth may be efficiently used by, for example, defining message types that carry less information to be shorter than other message types. The types may be, e.g., request, response, and data. The SID field carries the SID of the message.

In some embodiments, the coherence links may have added features over the physical FBDIMM link and framing. For example, the coherence links may implement reliable delivery. The transmitter on a link may retain a transmitted coherence message and, if an error occurs at the receiver for the message, the transmitter may retransmit the message. In some cases, a more robust cyclical redundancy check (CRC) or other error detection mechanism may be implemented for the coherence messages than the frame-based error detection that may be provided on the FBDIMM links.

Figure 12:
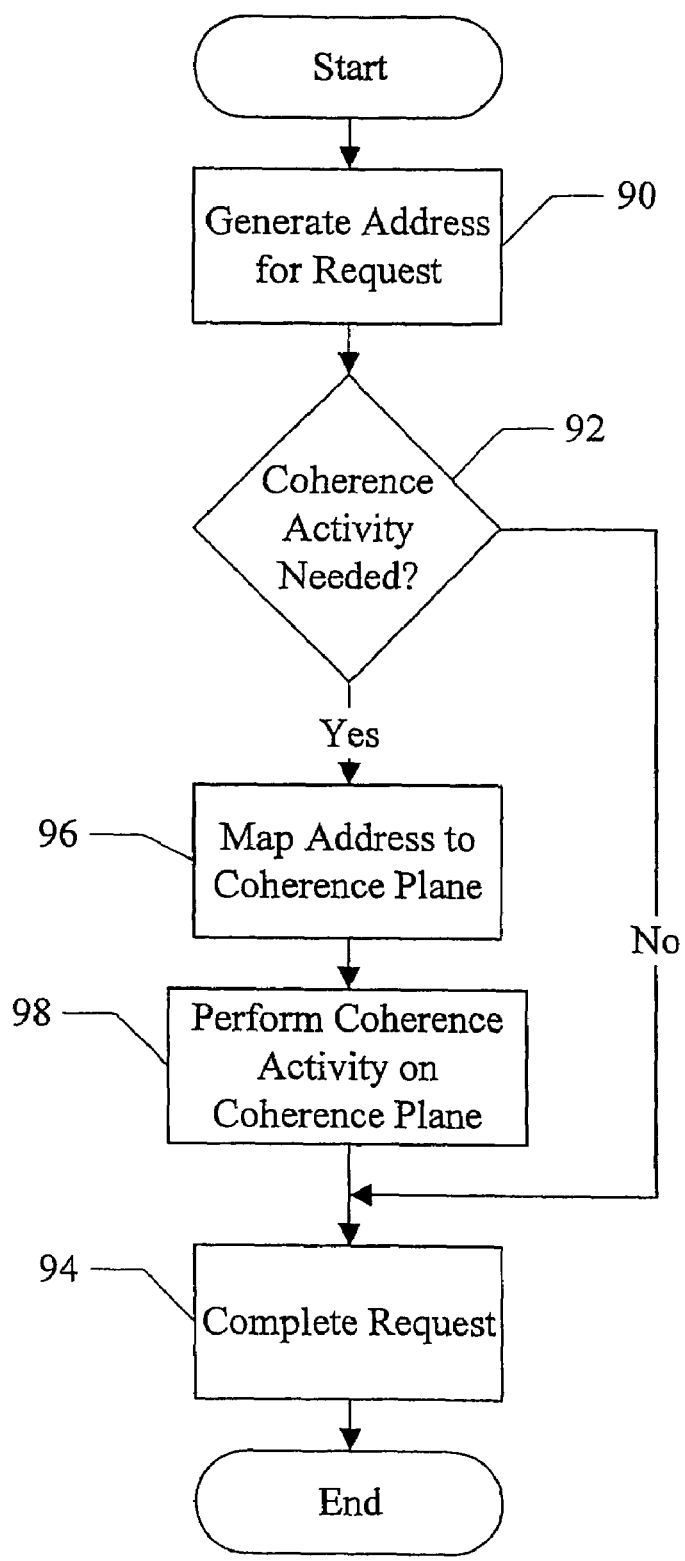
FIG. 12 is a flowchart illustrating one embodiment of a method for coherence planes.

Turning now to FIG. 12, a flowchart is shown illustrating one embodiment of a method for maintaining coherency in a system using coherence planes. While the blocks shown are illustrated in a particular order for ease of understanding, other orders may be used. Blocks may be implemented in parallel in combinatorial logic circuitry. Blocks, combinations of blocks, or the flowchart as a whole may be pipelined over multiple clock cycles.

The address for the request may be generated in the source node (block 90). Particularly, for example, one of the processor cores 12A-12N may generate the address. The address may miss in the L1 cache(s) in the processor core, and may be transmitted to the L2 cache 14. If no coherence activity external to the node is needed to complete the request (decision block 92, "no" leg), the L2 cache 14 may complete the request (block 94). If coherence activity external to the node is needed (decision block 92, "yes" leg), the address may be mapped to one of the coherence planes (block 96), and the coherence activity may be performed on the coherence plane (block 98). When the coherence activity is completed, the request may be completed (block 94). In some embodiments above, mapping the address to a coherence plane may be implicit in mapping the address to an L2 cache bank. Other mappings of addresses to coherence planes may be used in other embodiments.

Figure 13:
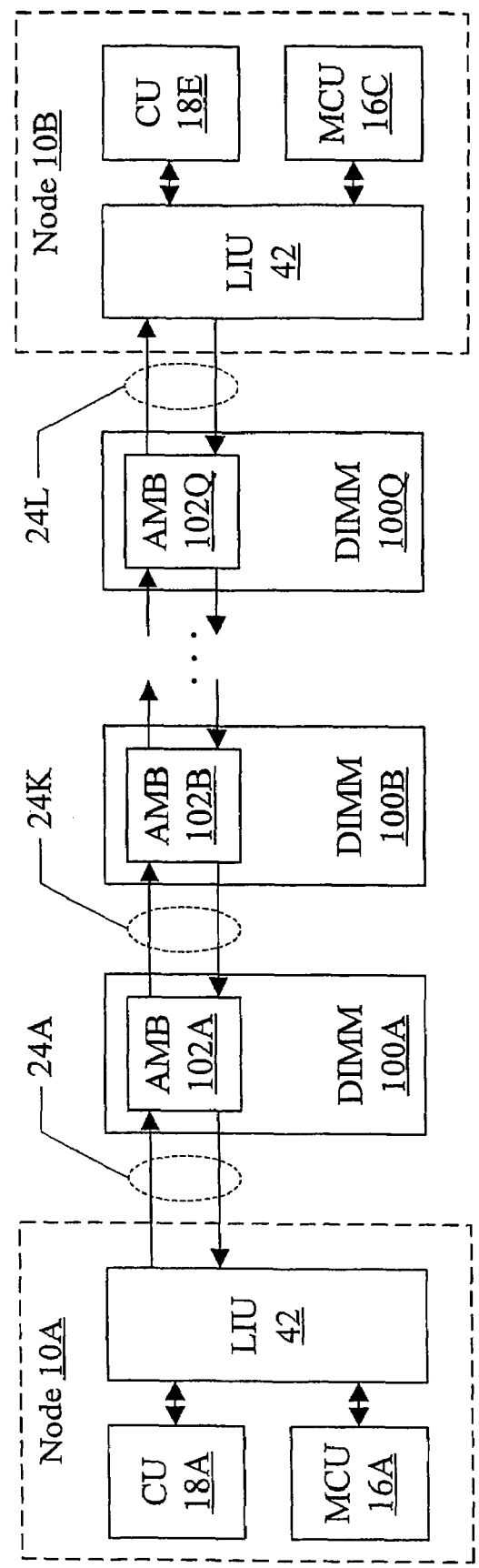
FIG. 13 is a block diagram of another embodiment of CMT nodes coupled and also illustrating memory modules coupled to the nodes.

Turning now to FIG. 13, a block diagram of another embodiment of a system including the CMT nodes 10A-10B is shown. In this embodiment, the interfaces 24 between the nodes are used both for communicating coherence messages and for accessing memory. For example, in the illustrated embodiment, the interfaces are coupled to one or more dual-inline memory modules (DIMMs) 100A-100Q. Any number of DIMMs may be included, or other types of memory modules may be included. In the illustrated embodiment, the interfaces 24 comprise point to point links and thus the DIMMs 100A-100Q are coupled in a daisy chain fashion between the nodes 10A-10B. Particularly, the interfaces 24 may be FBDIMM interfaces and the DIMMs 100A-100Q may be FBDIMMs. FBDIMMs include advanced memory buffers (AMBs) such as AMBs 102A-102Q for buffering communications from the FBDIMM interfaces and for controlling communication on the interfaces. As illustrated in FIG. 13, the interface 24A is coupled between the node 10A and the DIMM 100A. Similarly, the interface 24K is coupled between the DIMMs 100A-100B, and the interface 24L is coupled between the DIMM 100Q and the node 10B. Other interfaces 24 may be coupled between other DIMMs that may be included in the system (not shown in FIG. 13).

Since the DIMMs 100A-100Q are coupled to the same communication path used to transmit coherence messages between nodes 10A-10B, the traffic on the path may comprise a mix of memory accesses and coherence messages. The coherence units and memory control units in the nodes 10A-10B may share a link interface unit (LIU) 42 to communicate on the interfaces 24. The LIU 42 may arbitrate between the coherence units and memory control units, or the coherence units and memory control units may communicate directly to control transmission on the interfaces 24.

In the illustrated embodiment, the coherence unit 18A and the MCU 16A may share the LIU 42 to communicate on the interface 24A. Similarly, the coherence unit 18E and the memory control unit 16C may share the LIU 42 to communicate on the interface 24L. Other coherence units 18B-18D and 18F-18H may communicate over other interfaces between the nodes 10A-10B. Some or all of those interfaces may also be populated with DIMMs similar to the DIMMs 100A-100Q, and memory control units may share the interfaces with the coherence units.

The AMBs 102A-102Q may receive a frame from an interface, and may check the frame to determine if it includes a memory access for the corresponding DIMM 100A-100Q (i.e. the DIMM that includes the AMB). If the frame includes a memory access for the corresponding DIMM 100A-100Q, the AMB 102A-102Q may process the frame and cause the access to one or more memory chips on the DIMM. If the memory access is a read, the AMB 102A-102Q may return the data on the same interface from which the frame was received. If the frame does not include a memory access for the corresponding DIMM (e.g. it includes a memory access for another DIMM or it includes one or more coherence messages), the AMB 102A-102Q may propagate the frame in the direction that the frame was traveling. For example, if the AMB 102A receives a frame from the interface 24A, the AMB 102A may propagate the frame on the interface 24K to the DIMM 100B. If the AMD 102A receives a frame from the interface 24K, it may propagate the frame on the interface 24A to the node 10A.

While the illustrated embodiment populates an interconnect between two nodes with memory modules, other embodiments may populate an interconnect between nodes and a coherency hub (e.g. similar to the embodiment of FIG. 3) in a similar fashion.

Numerous variations and modifications will become apparent to those skilled in the art once the above disclosure is fully appreciated. It is intended that the following claims be interpreted to embrace all such variations and modifications.

What is claimed is:

1. A node comprising:
   at least one processor core configured to generate an address to access a memory location, wherein the address maps to a first coherence plane of a plurality of coherence planes, wherein coherence activity is performed within each of the plurality of coherence planes independent of other ones of the plurality of coherence planes, and wherein the address is included in an address space, and wherein a mapping of the address space across the plurality of coherence planes is independent of a physical location of the memory in a distributed system memory, and wherein the address space includes respective addresses that are mapped to each of the plurality of coherence planes; and a plurality of coherence units, wherein each of the plurality of coherence units corresponds to a respective coherence plane of the plurality of coherence planes and is configured to manage coherency for the node and for the respective coherence plane, the plurality of coherence units operating independent of each other, and wherein a first coherence unit of the plurality of coherence units corresponding to the first coherence plane is coupled to receive the address if external coherency activity is needed to complete the access to the memory location.

2. The node as recited in claim 1 wherein each of the plurality of coherence units is coupled to a different external interface.

3. The node as recited in claim 2 wherein each external interface comprises point to point links.

4. The node as recited in claim 1 wherein each address in the address space maps to one of the plurality of coherence planes.

5. The node as recited in claim 4 wherein each address within the same coherence granule maps to the same one of the plurality of coherence planes.

6. The node as recited in claim 1 wherein the node further comprises a cache comprising a plurality of cache banks, and wherein each of the plurality of cache banks is assigned to one of the plurality of coherence planes and is coupled to one of the plurality of coherence units dependent on which of the plurality of coherence planes it is assigned to.

7. The node as recited in claim 6 wherein pairs of the plurality of banks are assigned to a same one of the plurality of coherence planes.

8. The node as recited in claim 1 wherein the processor core is multithreaded.

9. The node as recited in claim 8 wherein the at least one processor core comprises a plurality of processor cores that are each multithreaded.

10. A system comprising:
a first node comprising a first plurality of coherence units, each of the first plurality of coherence units corresponding to a respective coherence plane of a plurality of coherence planes, wherein each of the first plurality of coherence units are configured to operate independent of the other ones of the first plurality of coherence units and coherency activity in each of the plurality of coherence planes is independent of coherency activity in other ones of the plurality of coherence planes; and
a second node comprising a second plurality of coherence units, each of the second plurality of coherence units corresponding to a respective coherence plane of the plurality of coherence planes, wherein each of the second plurality of coherence units are configured to operate independent of the other ones of the second plurality of coherence units;
wherein each of the first plurality of coherence units is configured to cooperate with a corresponding one of the second plurality of coherence units to manage coherency for the respective coherence plane, wherein a mapping of an address space across the plurality of coherence planes is independent of a physical location of the memory in a distributed system memory implemented by the nodes.

11. The system as recited in claim 10 wherein each of the first plurality of coherence units is coupled to a respective one of a plurality of external interfaces, and wherein each of the second plurality of coherence units is coupled to the respective one of the plurality of external interfaces.

12. The system as recited in claim 11 wherein each of the plurality of external interfaces comprises a pair of point to point links.

13. The system as recited in claim 10 further comprising a plurality of coherence hubs, each corresponding to a different one of the plurality of coherence plane, wherein each of the first plurality of coherence units is coupled to a respective hub of the plurality of coherence hubs and each of the second plurality of coherence units is coupled to the respective hub of the plurality of coherence hubs, and wherein the respective coherence hub is configured to route coherence messages in the corresponding coherence plane.

14. The system as recited in claim 10 wherein the first node further comprises a cache comprising a plurality of cache banks, wherein each of the plurality of cache banks is assigned to one of the plurality of coherence planes and is coupled to one of the first plurality of coherence units dependent on which of the plurality of coherence planes it is assigned to.

15. The node as recited in claim 14 wherein pairs of the plurality of banks are assigned to a same one of the plurality of coherence planes.

16. A method comprising:
generating an address to access a memory location in a node of a system;
mapping the address to one of a plurality of coherence planes, wherein coherence activity in each of the plurality of coherence planes is independent of other ones of the plurality of coherence planes, and wherein a mapping of addresses to coherence planes is independent of whether the address is local or remote for the node, and wherein the address is included in an address space, and wherein the address space includes respective addresses that are mapped to each of the plurality of coherence planes; and
performing coherence activity, if needed, in the one of the plurality of coherence planes.

17. The method as recited in claim 16 wherein the node comprises a cache comprising a plurality of cache banks, and wherein the mapping of addresses to coherence planes is dependent on which of the plurality of cache banks the address are mapped to.

18. The method as recited in claim 17 wherein pairs of cache banks are mapped to respective coherence planes of the plurality of coherence planes.

19. The method as recited in claim 16 further comprising completing the access subsequent to performing the coherence activity.

\* \* \* \* \*